(12) United States Patent
Farooq et al.

(10) Patent No.: US 9,701,233 B1
(45) Date of Patent: Jul. 11, 2017

(54) VEHICLE CONSOLE TO SEAT GAP BLOCKER ASSEMBLY

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/132,541

(22) Filed: Apr. 19, 2016

(51) Int. Cl.
*B60N 3/00* (2006.01)
*E05F 13/02* (2006.01)

(52) U.S. Cl.
CPC ............... *B60N 3/00* (2013.01); *E05F 13/02* (2013.01); *B60N 2205/40* (2013.01)

(58) Field of Classification Search
CPC .................................. B60N 3/00; E05F 13/02
USPC ............ 296/24.34, 37.8, 1.07, 1.08; 297/144
See application file for complete search history.

(56) References Cited

U.S. PATENT DOCUMENTS

| | | | |
|---|---|---|---|
| 4,948,195 A | 8/1990 | Saunders | |
| 5,887,941 A | 3/1999 | Kopinski et al. | |
| 7,758,090 B2 | 7/2010 | Gregory | |
| 2004/0217615 A1* | 11/2004 | Lindstrom | B60N 2/4686 296/24.34 |
| 2007/0235483 A1 | 10/2007 | Konet | |
| 2009/0108609 A1* | 4/2009 | Hirai | B60R 7/04 296/37.16 |
| 2009/0224563 A1* | 9/2009 | Gregory | B60R 11/00 296/1.07 |
| 2011/0266820 A1* | 11/2011 | Hurwitz | B60N 2/6009 296/1.07 |
| 2014/0252811 A1* | 9/2014 | Whalen | B60N 3/002 297/144 |

* cited by examiner

*Primary Examiner* — Joseph D Pape
(74) *Attorney, Agent, or Firm* — Vichit Chea; Price Heneveld LLP

(57) ABSTRACT

A gap blocker assembly includes a support structure and a gap blocker panel operably coupled to the support structure. The gap blocker panel is movable to a substantially horizontal position to block a gap between a center console assembly and a seat.

19 Claims, 10 Drawing Sheets

VEHICLE CONSOLE TO SEAT GAP BLOCKER ASSEMBLY

FIELD OF THE INVENTION

The present disclosure generally relates to a gap blocker. More specifically, the present disclosure relates to a gap blocker used in a vehicle for blocking the gap that exists between a center console assembly and a seat.

BACKGROUND OF THE INVENTION

Many vehicles typically have a space, or gap, between the seat and the center console assembly. This gap generally permits items to fall between the seat and the center console assembly that are difficult to retrieve while occupying the seat.

SUMMARY OF THE INVENTION

According to one aspect of the present disclosure, a gap blocker assembly for a vehicle includes a support structure and a gap blocker panel. The gap blocker panel is operably coupled to the support structure and can be moved to a substantially horizontal position to block a gap between a center console assembly and a seat.

According to another aspect of the present disclosure, a gap blocker assembly for a vehicle includes a center console assembly, a support structure connected to the center console assembly, and a gap blocker panel. The gap blocker panel is operably coupled to the support structure and can be moved between a substantially vertical position and a substantially horizontal position. When the gap blocker panel is in the substantially horizontal position the gap between the center console assembly and the seat is blocked, thereby preventing items from falling between the seat and the center console assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
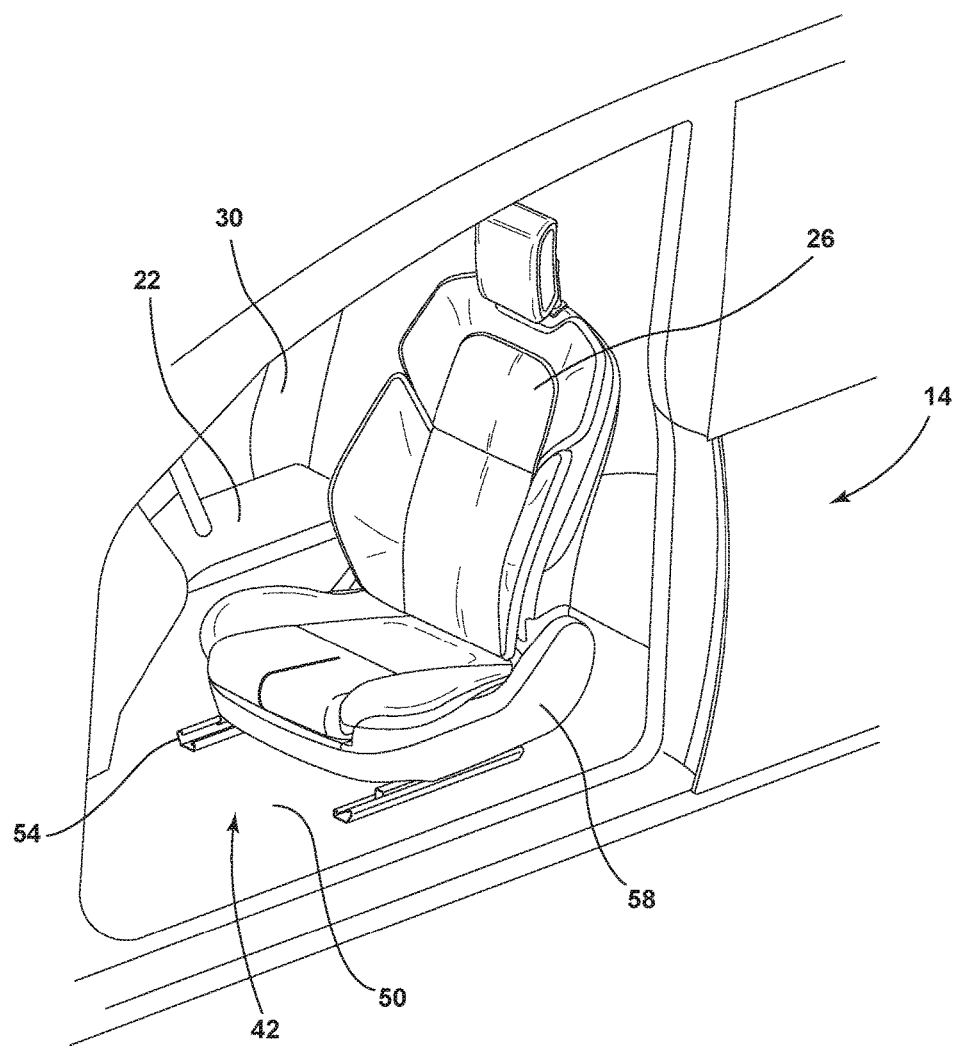
FIG. 1 is a top perspective view of a vehicle interior equipped with a gap blocker assembly.
Figure 2:
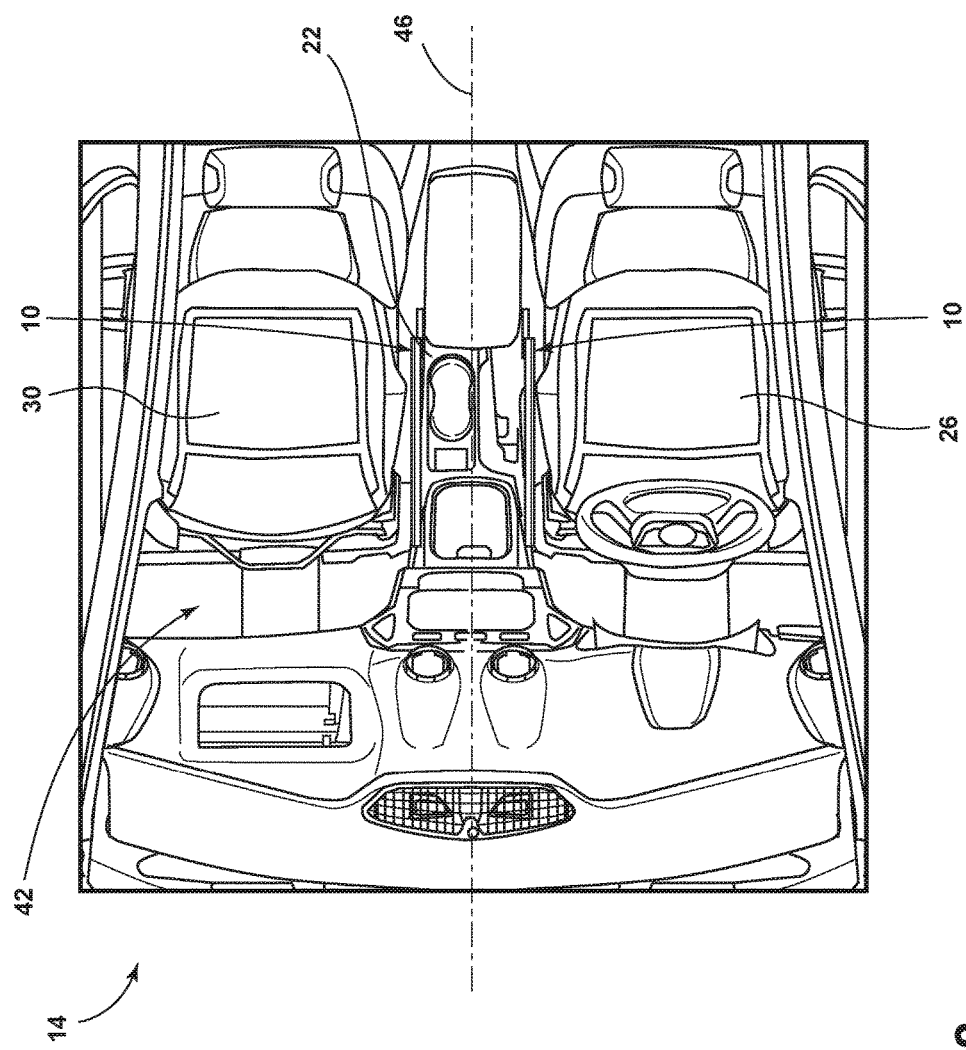
FIG. 2 is an aerial top view of an interior passenger compartment of the vehicle showing the gap blocker assembly.
Figure 3:
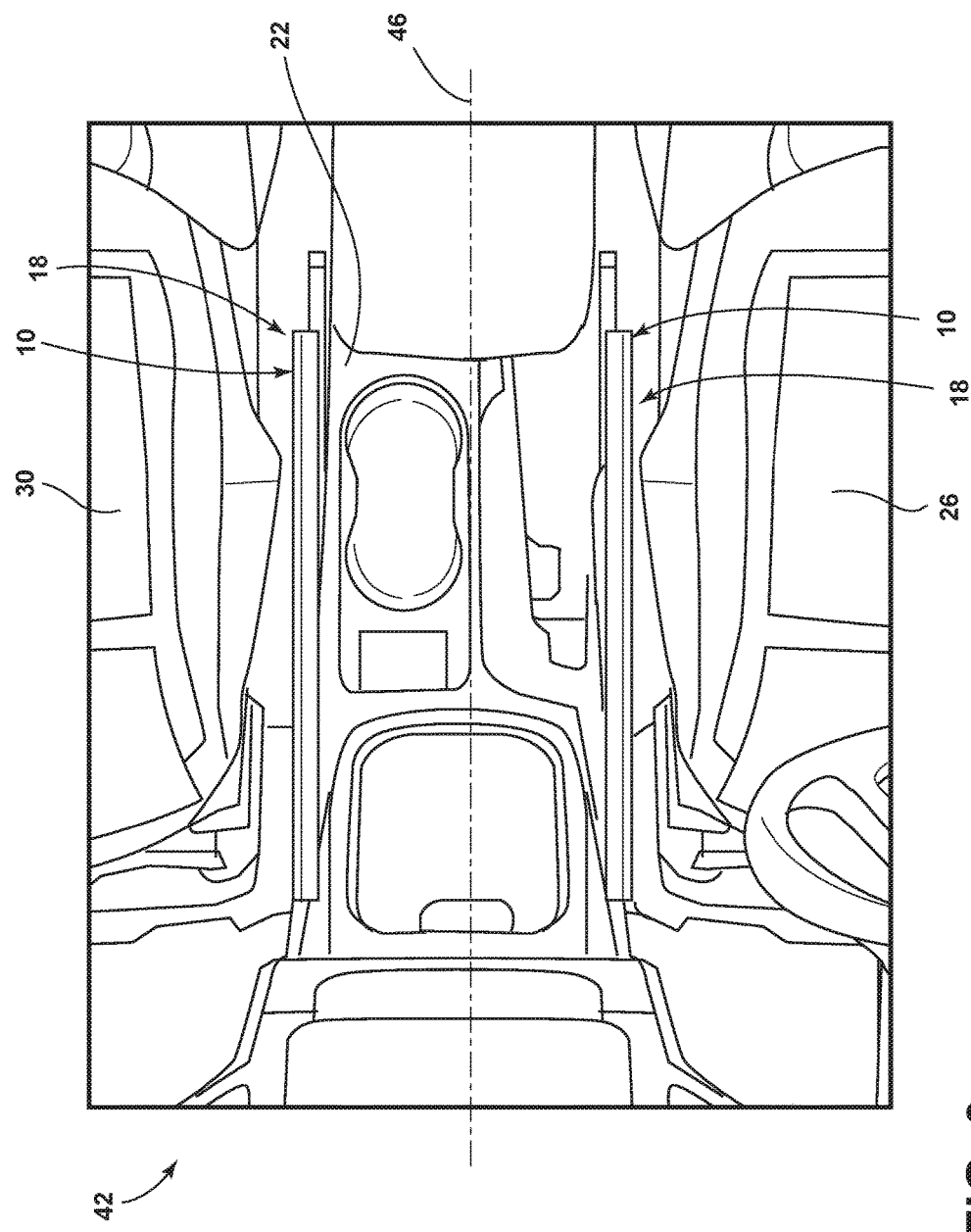
FIG. 3 is an enlarged aerial top view of the interior of the vehicle shown in FIG. 2, showing one embodiment of a gap blocker assembly in a substantially vertical, or stowed position.

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a gap blocker assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-9, a deployable gap blocker assembly 10 for a vehicle 14 is shown for use in blocking a gap 18 between a center console assembly 22 and a driver's seat 26 and/or a passenger's seat 30. The gap blocker assembly 10 is operably coupled to the center console assembly 22 by a support structure 34. The gap blocker assembly 10 includes a gap blocker panel 38 that is operably coupled to the support structure 34. The gap blocker panel 38 is movable between a substantially vertical position (FIGS. 2, 3, 5, and 8) and a substantially horizontal position (FIGS. 4, 4A, 6, and 9). With the gap blocker panel 38 in the substantially vertical position shown in FIGS. 2 and 3, the gap 18 is present between the center console assembly 22 and the seats 26, 30. The gap 18 is an open space through which objects may pass. When in the substantially horizontal position (FIGS. 4, 4A, 6, and 9), the gap blocker panel 38 blocks the gap 18 that exists between the center console assembly 22 and the seats 26, 30 to prevent objects from falling through the gap 18. While the vehicle 14 shown resembles a four-door sedan, it is contemplated that other vehicle types can be used without departing from the concepts disclosed herein. For example, the disclosed concepts can be used in coupes, station wagons, cargo wagons, mini-vans, full size vans, cargo vans, sport utility vehicles, trucks, and the like.

In an additional embodiment, the deployable gap blocker assembly 10 for the vehicle 14 blocks the gap 18 between the center console assembly 22 and the driver's seat 26. The gap blocker assembly 10 is operably coupled to the driver's seat 26 by the support structure 34. The gap blocker assembly 10 includes the gap blocker panel 38 that is operably coupled to the support structure 34. The gap blocker panel 38 is movable between the substantially vertical position (FIGS. 2, 3, 5, and 8) and the substantially horizontal position (FIGS. 4, 4A, 6, and 9). With the gap blocker panel 38 in the substantially vertical position shown in FIGS. 2 and 3, the gap 18 is present between the center console assembly 22 and the driver's seat 26. The gap 18 is an open space through which objects may pass. When in the substantially horizontal position (FIGS. 4, 4A, 6, and 9), the gap blocker panel 38 blocks the gap 18 that exists between the center console assembly 22 and the driver's seat 26 to prevent objects from falling through the gap 18.

Referring now to FIGS. 1-4, reference numeral 42 generally designates an interior of the passenger compartment of the vehicle 14. The interior 42 of the vehicle 14, as shown, includes the driver's seat 26 and the passenger's seat 30 disposed in a side-by-side configuration with the center console assembly 22 disposed along a longitudinal axis 46 of the vehicle 14 between the driver's seat 26 and the passenger's seat 30. The gap blocker assembly 10 is operably coupled to the center console assembly 22. In the embodiment shown, the gap blocker assembly 10 is assembled onto, and thereby connected to, the center console assembly 22 via the support structure 34. It is contemplated that the support structure 34 can be otherwise mounted to the vehicle 14 to provide the gap blocker panel 38 of the present disclosure. For example, the support structure 34 can be operably coupled to a floor 50 of the vehicle 14, a track assembly 54 of the vehicle seat, a vehicle seat base 58, or the like without departing from the concepts disclosed herein. Rotation of the gap blocker panel 38 from the substantially vertical position (FIGS. 3 and 5) to the substantially horizontal position (FIGS. 4, 4A, and 6) can be accomplished by the user manually rotating the gap blocker panel 38 with an applied force.

Figure 4:
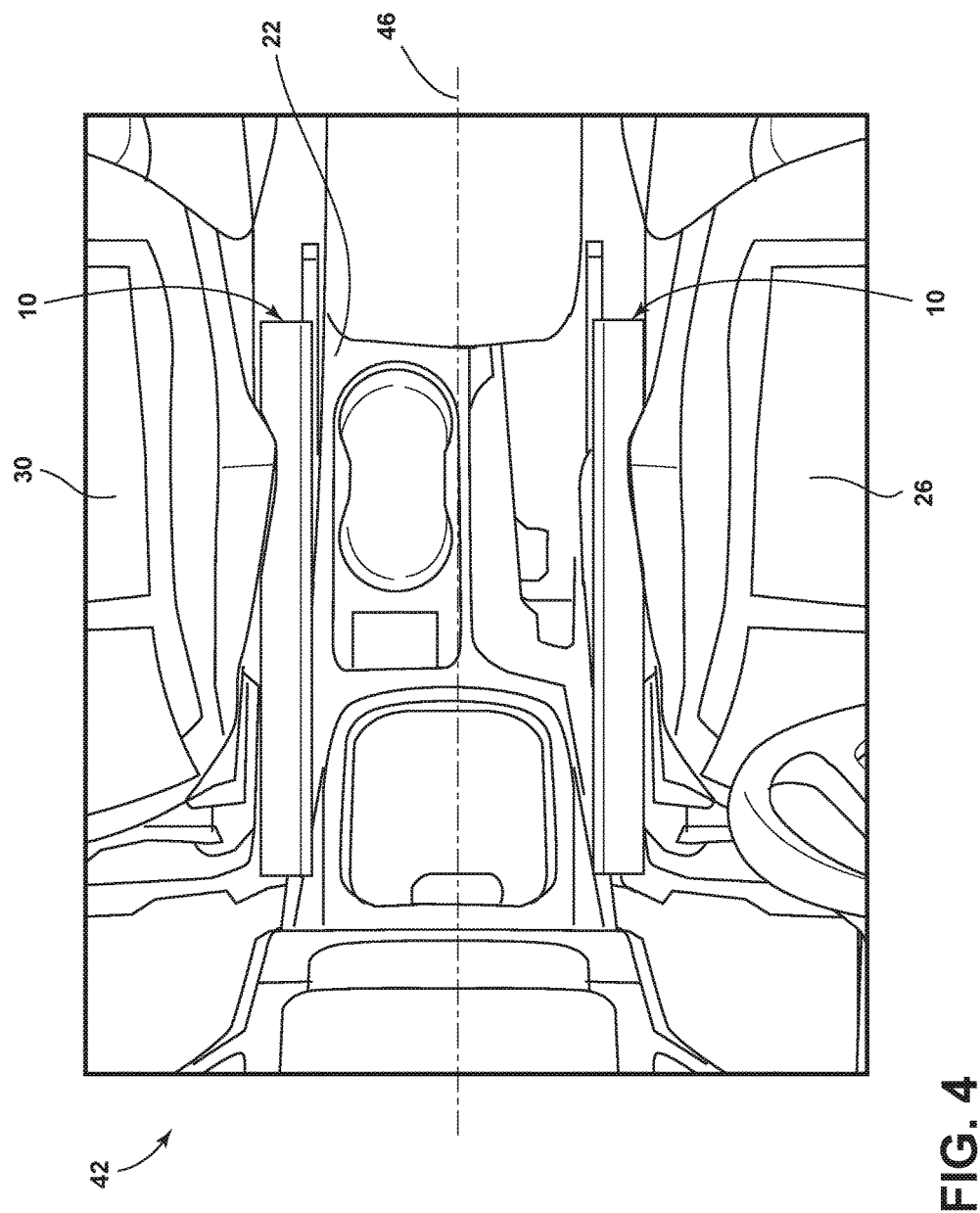
FIG. 4 is an enlarged aerial top view of the interior of the vehicle, similar to FIG. 3, showing the gap blocker assembly in a substantially horizontal, or deployed position.
Figure 4A:
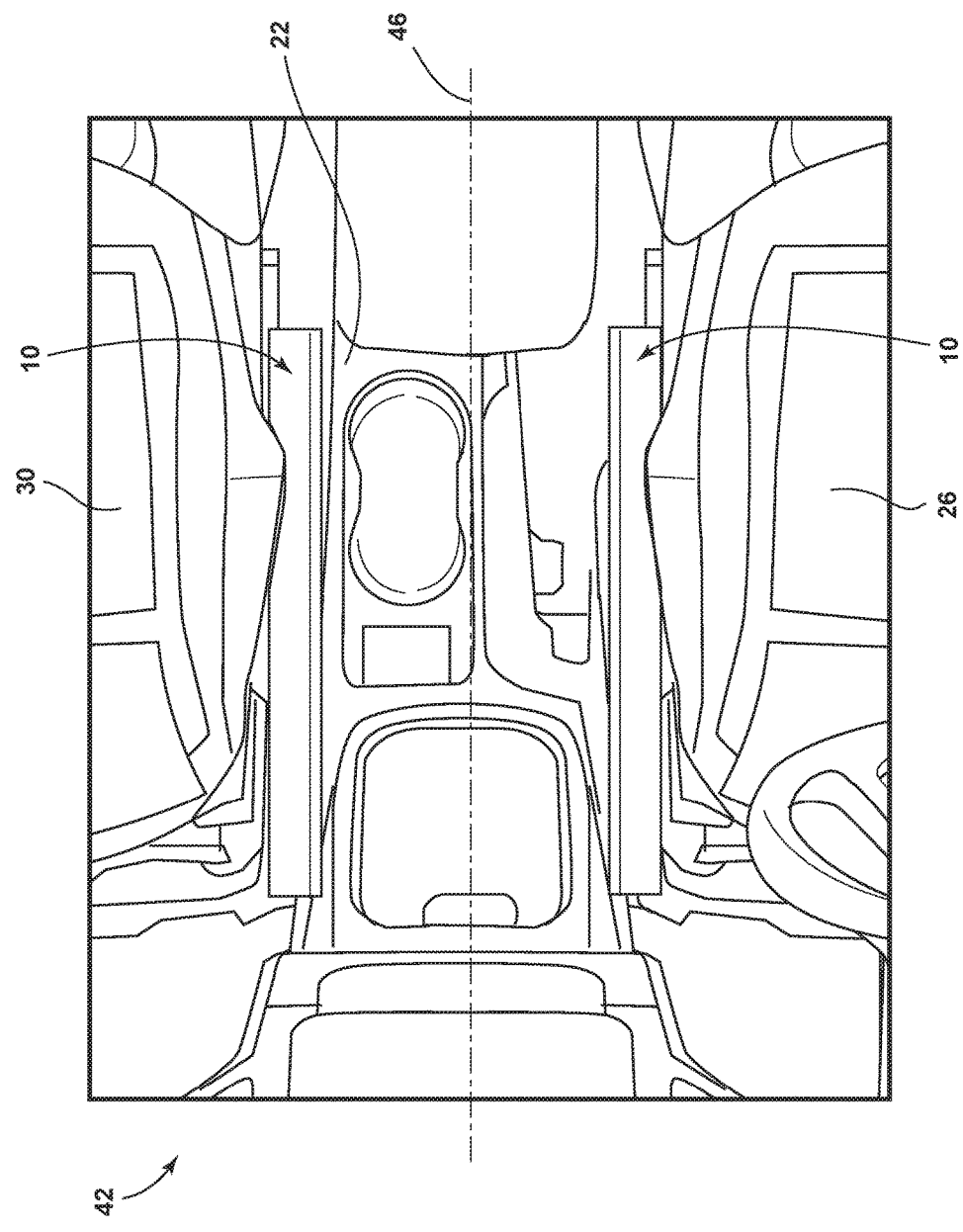
FIG. 4A is an enlarged aerial top view of the interior of the vehicle, similar to FIG. 3, showing the gap blocker in a substantially horizontal, or deployed position.
Figure 5:
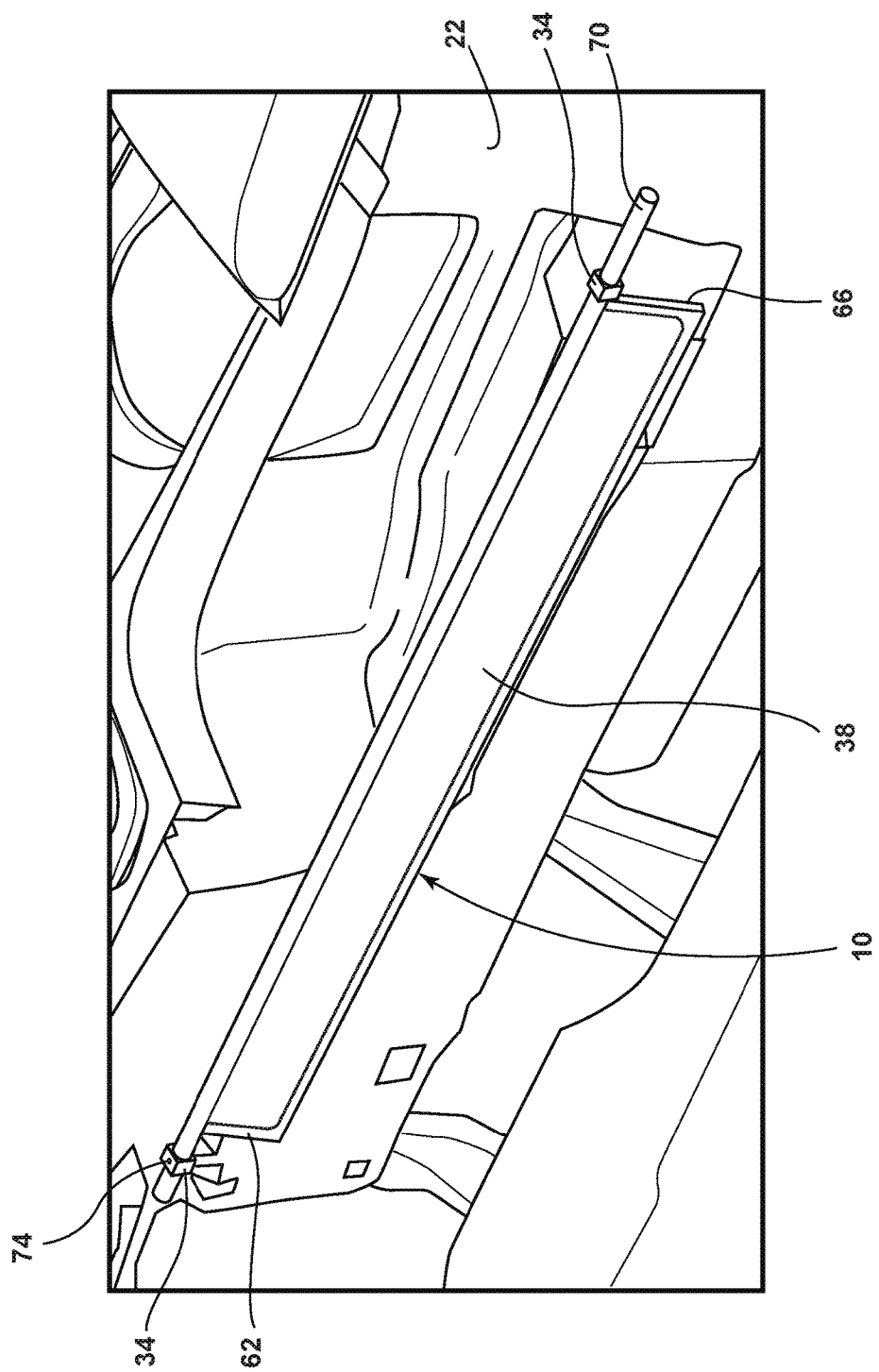
FIG. 5 is an elongated side perspective view of the gap blocker assembly in the substantially vertical, or stowed, position with the driver's seat removed for better clarity.
Figure 6:
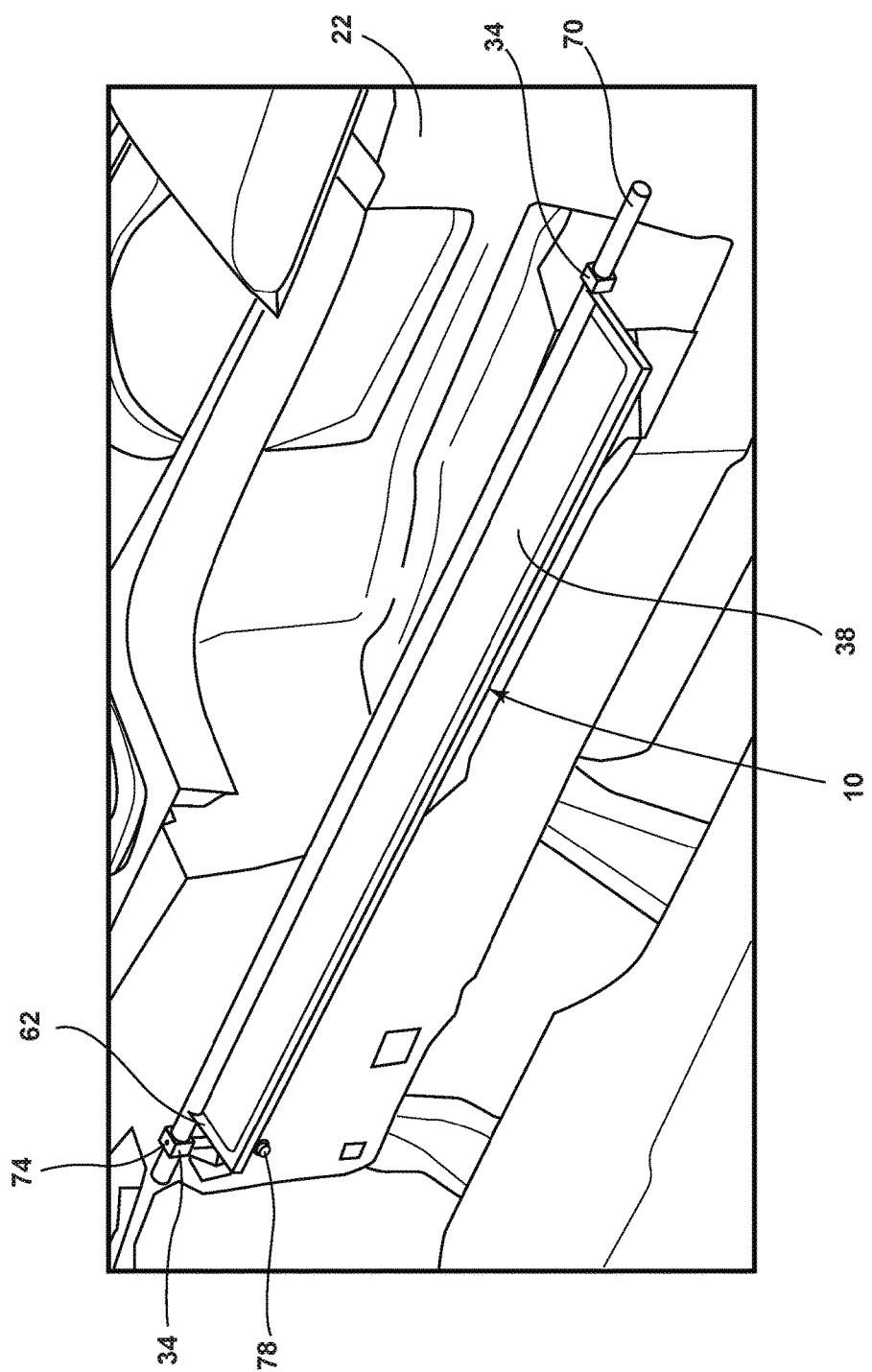
FIG. 6 is a side perspective view of the gap blocker assembly in the substantially horizontal, or deployed, position with the driver's seat removed for better clarity.
Figure 7:
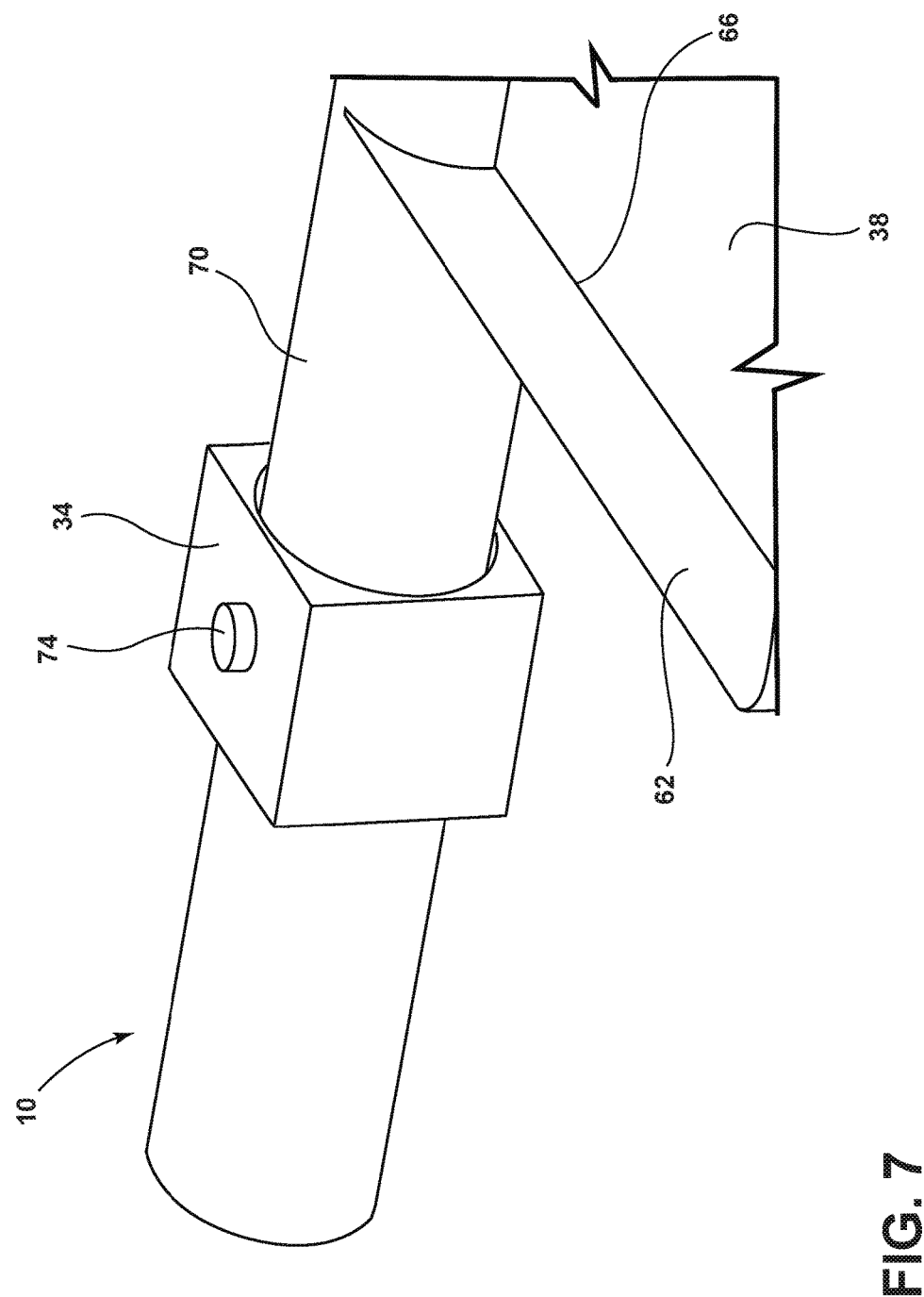
FIG. 7 is an enlarged view of one embodiment of a support structure for the gap blocker assembly.

Referring to FIGS. 3-7, the gap blocker panel 38 of the gap blocker assembly 10 is movable between a substantially vertical, or stowed, position (FIGS. 3 and 5) and a substantially horizontal, or deployed, position (FIGS. 4, 4A, and 6). In one embodiment, the gap blocker panel 38 can have a sidewall 62 operably coupled to a peripheral edge 66 of the gap blocker panel 38 and extending perpendicular to the plane of the gap blocker panel 38 to form a tray, such that items caught by the gap blocker panel 38, when in the substantially horizontal position (FIGS. 4, 4A, and 6), remain on the gap blocker panel 38 and cannot slide off of the gap blocker panel 38. The gap blocker panel 38 can be attached to a rotatable member, such as a rotatable rod 70, which extends along the longitudinal axis 46 of the vehicle 14. The rod 70 is operably coupled to the center console assembly 22 by the support structure 34. The support structure 34 can be a latch, a hinge, a pivoting bracket, and/or other suitable connector that supports the rod 70 and gap blocker panel 38 and permits rotational or pivoting motion of the rod 70 and gap blocker panel 38 as recognized by one of skill in the art. The support structure 34 may be fastened or otherwise connected to a side wall or top wall of the center console assembly 22. The support structure 34 can include a locking mechanism, such as a spring-loaded push pin 74, which facilitates locking of the gap blocker panel 38 in the substantially horizontal position (FIGS. 4, 4A, 6, and 7). It is contemplated that, while more than one support structure 34 is shown in the appended drawings; a single support structure 34 can be used in alternative embodiments of the present disclosure. Similarly, more than two support structures 34 can be used in alternative embodiments of the present disclosure without departing from the concepts disclosed herein. The locking mechanism of the support structure 34 can be located in one or more of the support structures 34.

While in the substantially vertical position (FIGS. 3 and 5), the gap blocker panel 38 can be held by a securing member 78 that prevents the gap blocker panel 38 from moving freely during vehicle operation. That is, the securing member 78 prevents the gap blocker panel 38 from moving freely and causing unwanted noise in the interior 42 of the vehicle 14 when the gap blocker panel 38 is in the stowed position. Suitable examples of the securing member 78 include, but are not limited to, hook and loop connectors (e.g. VELCRO®), foam, magnets, clips, and/or retainers. As will be recognized by one of skill in the art, the securing member 78 can be a single piece or multiple pieces that interact with one another. For example, when VELCRO® or a magnet are used, the securing member 78 includes a first portion that is operably coupled to the center console assembly 22 and a second portion that is operably coupled to the gap blocker assembly 10. In such an example, where the securing member 78 utilizes a first portion and a second portion, the two portions would be so located to facilitate an interaction between the two portions when the gap blocker panel 38 is placed in the substantially vertical position.

Figure 8:
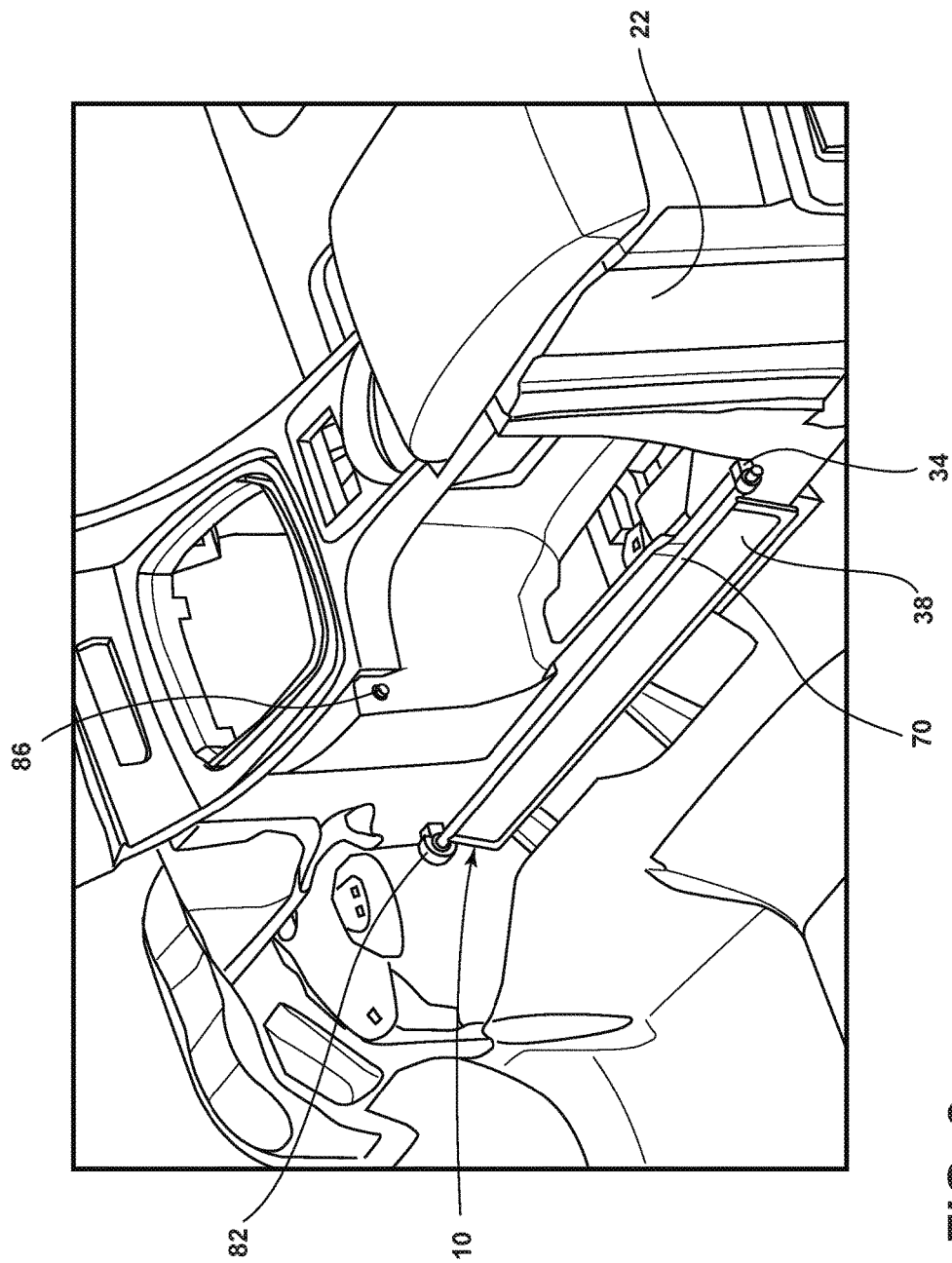
FIG. 8 is a side perspective view of a power actuated embodiment of a gap blocker assembly in a substantially vertical, or stowed, position with the driver's seat removed for better clarity.
Figure 9:
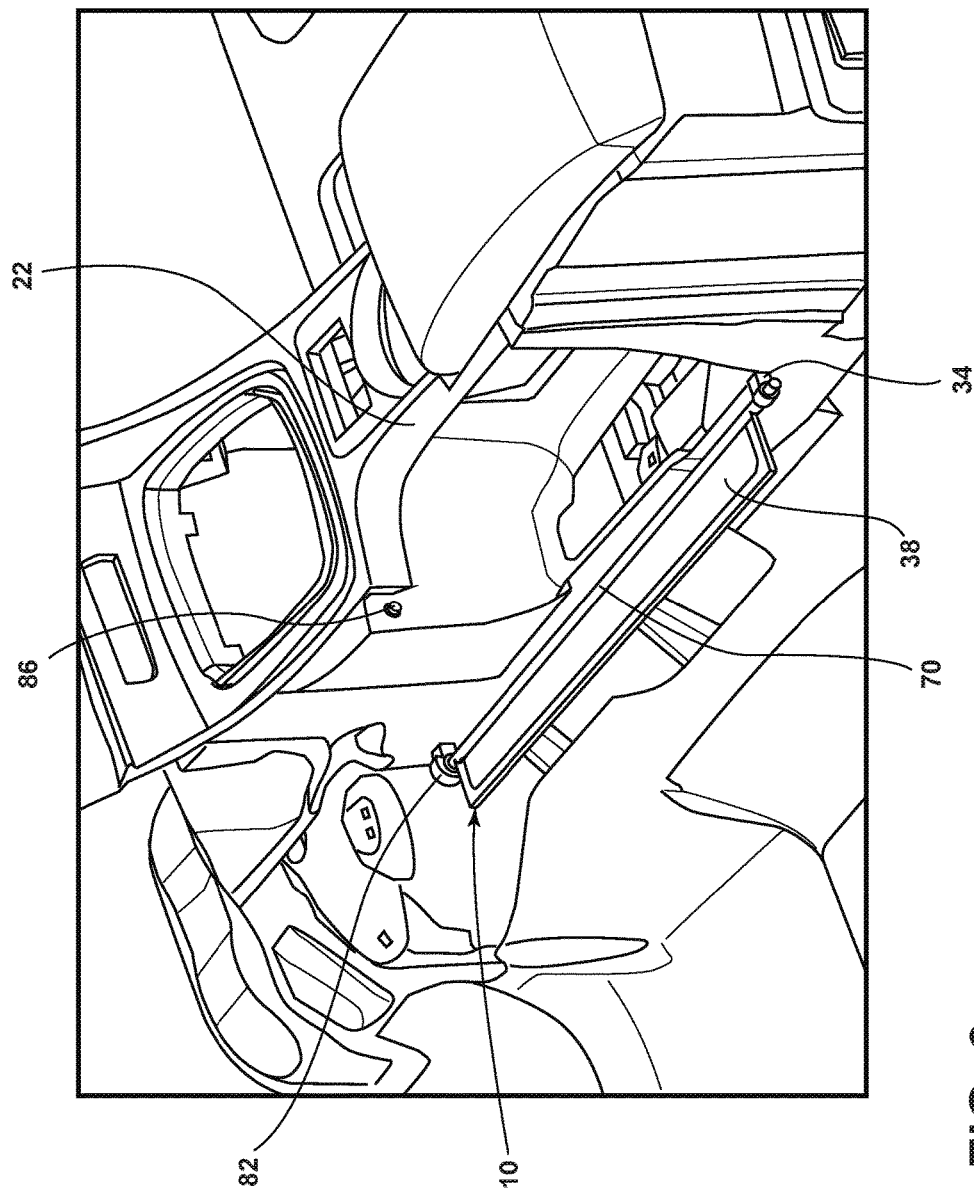
FIG. 9 is a side perspective view of the gap blocker assembly, similar to FIG. 8, in a substantially horizontal, or deployed, position with the driver's seat removed for better clarity.

Referring now to FIGS. 8-9, an additional embodiment of the gap blocker assembly 10 is shown. In this embodiment the rotation of the gap blocker panel 38 between the substantially vertical position (FIG. 8) and the substantially horizontal position (FIG. 9) is accomplished by a powered actuator, such as a motor 82. The motor 82 can be operably coupled to the rod 70 to actuate the rod 70 and gap blocker panel 38. The motor 82 can be activated manually by a switch 86. For example, the switch 86 can be, but is not limited to, a push-button switch, a toggle switch, a proximity switch, a rocker switch, or a slide switch. Alternatively, the motor 82 can be activated in a hands-free manner, for example, by a voice command. The location of the switch 86 is chosen such that the user can easily reach the switch 86 while occupying the driver's seat 26. For example, the switch 86 can be located on the center console assembly 22, the instrument panel, the radio area, the steering wheel, or the like.

The vertical positioning of the gap blocker assembly 10 on the center console assembly 22 is chosen such that accessibility to the functionality of the center console assembly 22 is maintained. For example, the vertical position of the gap blocker assembly 10 on the center console assembly 22 can be chosen such that accessibility to the parking brake, cup holders, and the like is not hindered.

While referred to from the perspective of the driver for blocking the gap 18 between the driver's seat 26 and the center console assembly 22 of the vehicle 14, the disclosed gap blocker assembly 10 can be used to block the gap 18 between the center console assembly 22 and the passenger's seat 30 or gaps adjacent to seats located rearward of the driver's seat 26 and passenger's seat 30 without departing from the disclosed concepts. Additionally, the disclosed gap blocker panel 38, while shown as a substantially rectangular member, can be configured in other shapes and sizes and to the contour of the gap 18 to which it is intended to block.

The gap blocker assembly 10 advantageously is deployable to block the gap 18 that exists between the vehicle seat and the center console assembly 22. The occupants of the vehicle 14 often lose items to the gap 18. The loss of items to the gap 18 is particularly frustrating and dangerous when the vehicle 14 is in motion because the occupant's natural response is to attempt retrieval of the lost item(s) immediately to increase the likelihood of finding the item(s). While it is less dangerous for the passenger to search for lost items than the driver when the vehicle 14 is in motion, the search the passenger embarks upon is nonetheless an unnecessary distraction for the vehicle 14 operator. The gap blocker assembly 10 disclosed herein provides a desirable alternative to losing items to the gap 18. The deployable nature of the gap blocker assembly 10 provides the vehicle 14 occupant(s) with the peace of mind of knowing that items dropped between the vehicle seat and the center console assembly 22 are caught by the gap blocker assembly 10 and can be easily retrieved at a time that is safe for the occupant to do so. Additionally, the gap blocker assembly 10 can be used as an additional storage surface to hold items that the occupant desires to keep within reach during their occupation of the vehicle 14.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A gap blocker assembly for a vehicle, comprising:
   a center console assembly;
   a support structure coupled to the center console assembly;
   a rod rotatably coupled to the support structure; and
   a gap blocker panel operably coupled to the rod, wherein the gap blocker panel is rotatable between a substantially vertical position and a substantially horizontal position about a fixed rotational axis, blocking a gap between the center console assembly and a seat.

2. The gap blocker assembly for a vehicle of claim 1, further comprising:
   a sidewall operably coupled to a peripheral edge of the gap blocker panel.

3. The gap blocker assembly for a vehicle of claim 1, further comprising:
   a spring-loaded push pin disposed in the support structure and configured to lock the gap blocker panel in the substantially horizontal position.

4. The gap blocker assembly for a vehicle of claim 2, further comprising:

a spring-loaded push pin disposed in the support structure and configured to lock the gap blocker panel in the substantially horizontal position.

5. The gap blocker assembly for a vehicle of claim 1, further comprising:
 a motor configured to rotate the gap blocker panel.

6. The gap blocker assembly for a vehicle of claim 1, further comprising:
 a securing member configured to secure the gap blocker panel in the substantially vertical position, wherein the securing member prevents the gap blocker panel from moving freely during operation of said vehicle.

7. A gap blocker assembly for a vehicle, comprising:
 a support structure; and
 a gap blocker panel operably coupled to the support structure and rotatable to a substantially horizontal position about a fixed rotational axis to block a gap between a center console assembly and a seat.

8. The gap blocker assembly for a vehicle of claim 7, wherein the support structure is operably coupled to the center console assembly.

9. The gap blocker assembly for a vehicle of claim 7, wherein the support structure is operably coupled to the seat.

10. The gap blocker assembly for a vehicle of claim 7, wherein the gap blocker panel is rotatable between a substantially vertical position and the substantially horizontal position.

11. The gap blocker assembly for a vehicle of claim 10, further comprising:
 a securing member configured to secure the gap blocker panel in the substantially vertical position, wherein the securing member prevents the gap blocker panel from moving freely during operation of said vehicle.

12. The gap blocker assembly for a vehicle of claim 7, further comprising:
 a sidewall operably coupled to a peripheral edge of the gap blocker panel.

13. The gap blocker assembly for a vehicle of claim 7, further comprising:
 at least one spring-loaded push pin disposed in the support structure.

14. The gap blocker assembly for a vehicle of claim 12, further comprising:
 at least one spring-loaded push pin disposed in the support structure.

15. The gap blocker assembly for a vehicle of claim 7, further comprising:
 a motor configured to rotate the gap blocker panel.

16. A gap blocker assembly for a vehicle, comprising:
 a support structure coupled to a center console; and
 a gap blocker panel operably coupled to the support structure and rotatable between a first position and a second position about a fixed rotational axis to block a gap between the center console assembly and a seat, wherein the first position is a generally horizontal position.

17. The gap blocker assembly for a vehicle of claim 16, further comprising:
 a securing member configured to secure the gap blocker panel in the substantially vertical position, wherein the securing member prevents the gap blocker panel from moving freely during operation of said vehicle.

18. The gap blocker assembly for a vehicle of claim 16, further comprising:
 at least one spring-loaded push pin disposed in the support structure.

19. The gap blocker assembly for a vehicle of claim 16, further comprising:
 a sidewall operably coupled to a peripheral edge of the gap blocker panel.

* * * * *